Nov. 18, 1958 R. F. KNIGHT 2,860,417
DEPTH MEASURING APPARATUS
Filed Dec. 20, 1956 3 Sheets-Sheet 2

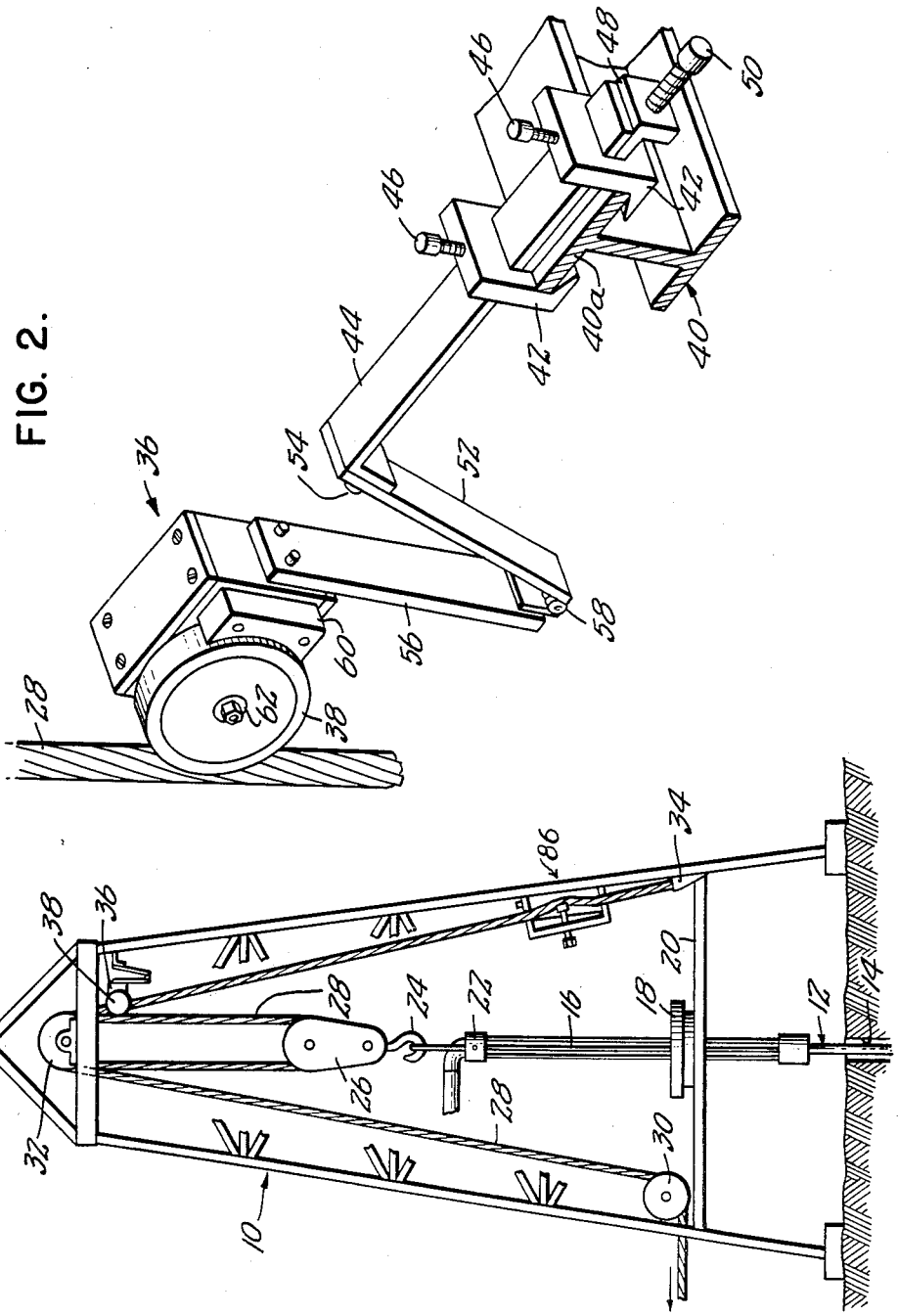

INVENTOR.
BY Robert F. Knight
Curtis, Morris & Safford
ATTORNEYS

Nov. 18, 1958   R. F. KNIGHT   2,860,417
DEPTH MEASURING APPARATUS
Filed Dec. 20, 1956   3 Sheets-Sheet 3
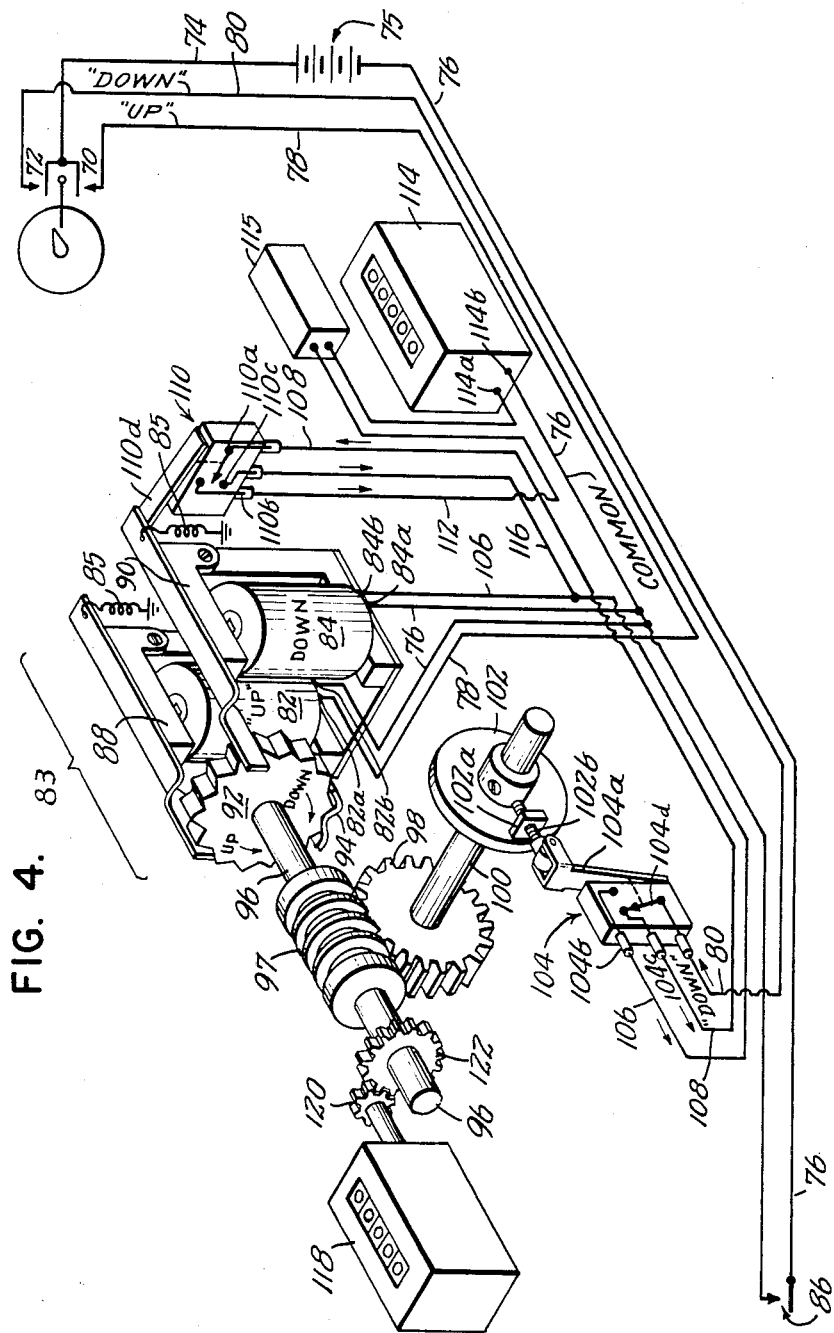
INVENTOR.
Robert F. Knight
BY
Curtis, Morris & Safford
ATTORNEYS

United States Patent Office

2,860,417
Patented Nov. 18, 1958

2,860,417

DEPTH MEASURING APPARATUS

Robert F. Knight, Irving, Tex., assignor to Core
Laboratories, Inc., Dallas, Tex.

Application December 20, 1956, Serial No. 629,581

8 Claims. (Cl. 33—134)

This invention relates to apparatus for measuring depth, for example for measuring the depth of the bore hole of a well being drilled for the production of oil or gas.

In drilling for petroleum, it is important to have an accurate measurement of the depth of the bore hole in order to locate the horizon from which production is obtained or is expected, or in order to correlate the geological data obtained from several wells, etc. It is necessary that the measurement be extremely accurate, because often the producing formation is only a few feet thick and may be located at a depth of 10 or 15 thousand feet or even more, so that an error of even a few hundredths of one percent would be intolerable.

Heretofore, various schemes have been employed for measuring depth, all of which have had serious shortcomings. One of the simplest means of measuring the depth of an oil well bore hole is to count the number of lengths or "joints" of drill pipe which are inserted into the bore hole and multiply this number by the length of each of the joints. This method is subject to error because of variation in the length of the individual joints, because of elongation of the joints due to the tension which is imposed when the drill string is suspended in the bore hole, and because of the human error which is involved in maintaining an accurate count of the number of joints. The counting of the drill joints requires constant attention since additional joints are added at irregular times during drilling.

Various types of apparatus have been devised for the purpose of measuring the length of the drill string mechanically. The use of all such automatic mechanical systems has been greatly complicated by the fact that the drilling bit is lifted off the bottom of the bore hole many times during the course of the drilling, for example to circulate out the cuttings, or to add an additional joint of drill pipe, or to make a "round trip" i. e. remove all of the drill pipe—for the purpose of replacing a worn drill bit or a washed out section of drill pipe or attaching a core bit and barrel or drill stem testing apparatus, or for the purpose of inserting into the bore hole a measuring instrument, a fishing tool or wire line coring device.

It is among the objects of the present invention to provide an apparatus for measuring the depth of a bore hole which is accurate and which automatically compensates for the movement of the drill string to lift the drill bit from and return it to the bottom of the bore hole, as well as disregarding all movement of the drill string supporting tackle during the time when it is not actually supporting the drill string. It is a further object of the invention to provide such an apparatus which is relatively simple and inexpensive in construction and which is reliable and foolproof in operating under conditions of actual use in the field.

In the drawings:

Figure 1 is a somewhat diagrammatic representation of an oil well drilling rig on which certain elements of a system embodying features of the present invention have been incorporated.

Figure 2 is an enlarged isometric view of the pick-up head of the apparatus.

Figure 4 is a skeleton view of the indicating unit of the apparatus showing the electrical connections between the various units of the apparatus.

Figure 3:
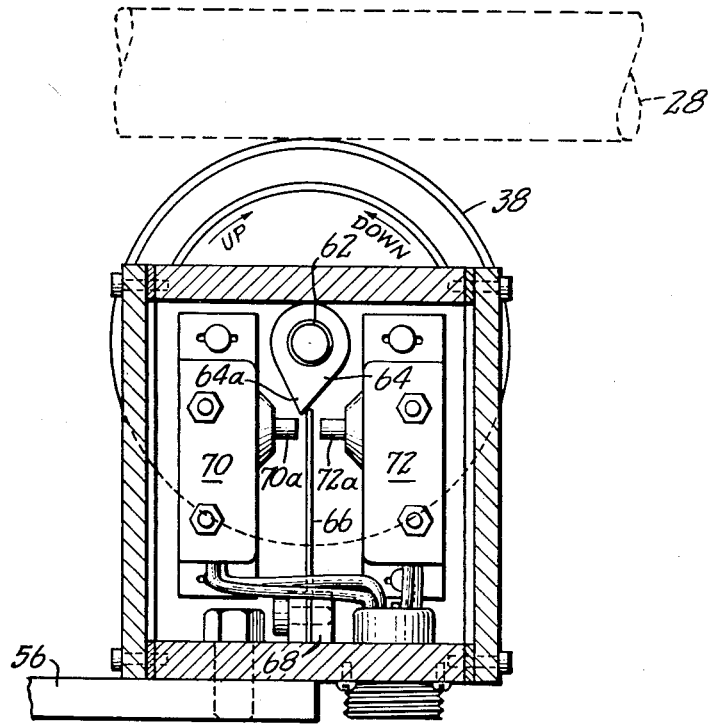
Figure 3 is an enlarged front view of the pick-up head with the cover plate removed.

Figure 1 shows a typical drilling rig including a derrick 10 with its associated tackle for supporting the drill string 12 which extends into the bore hole 14 and which carries at its lower end the drill bit (not shown). At the upper end of the drill string 12 is connected the "kelly" 16 which is of square cross section and which extends slidably through a square opening in the rotary table 18 on the drilling floor 20 of the derrick 10. The upper end of the kelly 16 is rotatably supported in a swivel 22 which is in turn supported by a hook 24 of the traveling block 26. A cable 28 extends from the draw works (not shown), up to the crown block 32 at the top of the derrick. It passes repeatedly over the sheaves of the crown block 32 and of the traveling block 26 and finally extends downwardly to a tie point 34 at the lower righthand corner of the derrick. When the cable 28 is pulled or payed out by the draw works, the traveling block 26 and the drill string 12 supported thereby are raised or lowered a proportionate distance.

Mounted near the top of the derrick 10 in position to engage one of the strands of cable 28 which extends between the crown block 32 and the traveling block 26 is a pick-up head generally designated 36, the purpose of which is to measure the amount of movement of the strand of cable 28 with which it is in engagement and thereby achieve a proportionate measurement of the distance through which the traveling block 26 and the drill string 12 are moved. The pick-up head 36 includes a wheel 38 the periphery of which is in frictional engagement with the "final" moving strand of cable which extends from the crown block 32 to the traveling block 26—that is, the moving strand nearest the tie point 34. This strand moves two feet for every one foot of movement of the traveling block. The wheel 38 has a circumference of exactly 12 inches, so that it is driven through 2 revolutions for each foot of movement of string 12.

Figure 2 shows the mounting of the pick-up head. As may be seen in this figure, the head 36 is supported on one of the framing members 40 of the derrick 10 by means of clamping jaws 42 which engage opposite edges of one of the flanges 40a of the framing member 40. An arm 44 extends through openings in the clamping jaws 42 and is held in engagement with them and with the framing member 40 by means of bolts 46 which are threaded through the clamping jaws 42 and engage the outer surface of the arm 44. The inner end of the arm 44 is provided with a perpendicular flange 48 through which is threaded a bolt 50 which bears against the outer surface of the clamping jaw 42 and further strengthens the assembly.

At the outer end of the arm 44 is fixed a second arm 52 which extends generally perpendicularly to the arm 44 and which is secured thereto by bolts 54. The opposite end of the arm 52 is hingedly attached to a lever 56 by means of a coil spring 58 which yieldably urges the lever 56 and the pick-up head 36 which is secured at its opposite end in the direction of the cable 28. The wheel 38 of the pick-up head 36 is thus maintained in frictional engagement with the cable 28.

The periphery of the wheel 38 is provided with a cylindrical surface which is in frictional contact with the cable 28. A wiping shoe 60 is mounted on the side of the pick-up head and is spaced very closely to the periphery of the wheel 38 to scrape off of the wheel 38 any tar, gummy grease or other extraneous matter which might otherwise tend to stick to the periphery of the wheel 38, increasing its effective diameter and impairing its measuring accuracy.

As may be seen in Figure 3, the wheel 38 is fixed at one end of a shaft 62 which is rotatably mounted on the pick-up head 36 and extends into the interior of the housing thereof. Also fixed on this shaft 62 is a cam 64 having an elevated portion 64a (Figure 3) which is adapted to engage one end of a leaf spring 66 the opposite end of which is supported by means of a clamp 68. The leaf spring 66 is interposed between the push buttons 70a and 72a of a pair of single-pole-single-throw switches 70 and 72 which are secured in the housing. Each revolution of the wheel 38 and the cam 64, the elevated portion of the cam 64a passes the leaf spring 66 and causes it to depress the push button of one or the other of the two switches 70 or 72, depending upon the direction of rotation of the wheel 38 and cam 64. For example, when the cable 28 is moving downwardly, as it does when the drill string 12 (Figure 1) is being lowered in the bore hole 14, the wheel 38 is driven in a counterclockwise direction, as viewed in Figure 3 and as indicated by the arrows in that figure, and the "down" switch 72 is closed once for each six inches of movement of the drill string. Similarly, when the cable is moved in the opposite direction to raise the drill string, the "up" switch 70 is closed once for each six inches of movement of the drill string.

As may be seen at the right-hand side of Figure 4, one of the contacts of each of the two switches 70 and 72 is connected through a lead 74 with one terminal of a storage battery 75 or other source of electrical current, the other terminal of the battery 75 being connected to a "common" circuit lead 76. The other contact of the switch 70 is connected to an "up" circuit lead 78 while the other contact of the switch 72 is connected to a "down" circuit lead 80. It will thus be seen that each time the "up" switch 70 is closed a pulse of current from the battery 75 is sent through the "up" circuit lead 78 and each time the "down" switch 72 is closed a pulse of current is sent through the "down" circuit lead 80.

The common lead 76 is connected to the measuring apparatus through a single-pole-single-throw "dead line" switch 86.

This "dead line" switch 86 is a tension-responsive switch which deactivates the measuring apparatus whenever the drill string is supported by slips in the rotary table rather than by the traveling block and the associated tackle, so that the measuring apparatus will not record any movements of the traveling block which do not affect the drill string—for example, movements of the traveling block to place the kelly into or remove it from the "rathole" or to pick up a new joint of drill pipe. As may be seen in Figure 1, the "dead line" switch 86 is mounted on the portion of the cable 28 which extends from the crown block 32 down to the tie point 34. Whenever the drill string 12 is supported on the traveling block 26, this section of the cable, as well as all the other portions of the cable 28, is under considerable tension; however, when the drill string 12 is supported by slips in the rotary table 18 rather than by the traveling block 26, the tension on the cable is greatly reduced—the only tension being that imposed by the weight of the traveling block 26, hook 24 and cable 28.

The "up" circuit lead 78 (Figure 4) is connected to one terminal 82a of an "up" solenoid 82 which forms part of an "add-subtract" solenoid assembly generally indicated at 83. The other terminal 82b of the "up" solenoid 82 is connected to the common lead 76 through the "dead line" switch 86. Thus, whenever the "dead line" switch 86 is closed, each pulse received in the "up" circuit actuates the "up" solenoid 82.

The "add-subtract" relay assembly 83 includes a pair of solenoids 82 and 84 having armatures 88 and 90 respectively which are positioned at opposite sides of a ratchet wheel 92. Each time the solenoid 82 is energized, its armature 88 is attracted downwardly against the force of a spring 85 to engage one of the teeth of the ratchet wheel 92 and index the ratchet wheel one step in the counterclockwise direction, as viewed in Figure 4 and as indicated by the arrow marked "up" in that figure. On the other hand, each time the "down" solenoid 84 is energized, its armature 90 is attracted downwardly to engage the ratchet wheel 92 and index it one step in the clockwise direction, as indicated by the arrow marked "down." A spring detent 94 engages the teeth of the ratchet wheel and maintains its position between actuations. Secured on the same shaft 96 on which the ratchet wheel 92 is mounted is a worm gear 97 which meshes with a worm wheel 98 secured on a shaft 100. Also fixed on this latter shaft 100 is a memory wheel 102 having at one side thereof a tab 102a in which is adjustably threaded a screw 102b which is adapted to engage the actuating roller leaf 104a of a single-pole-double-throw "off bottom" switch 104.

The memory wheel 102 is shown in its "on bottom" position at which the screw 102b is in engagement with the actuating leaf 104a of the switch 104. The screw 102b is so positioned and adjusted that upon the first pulse of current received by the "up" solenoid 82, the memory wheel 102 will be driven through a sufficient angle to release the actuating leaf 104a of the "off bottom" switch 104. As the upward movement of the drill string continues, each successive pulse received by the "up" solenoid 82 will index the memory wheel 102 through an equal angle in the same direction, moving the screw 102b progressively farther away from the actuating leaf 104a of the "off bottom" switch 104. When the drill string is moved back down toward the bottom of the bore hole, pulses of current will be sent to the "down" solenoid 84, causing it to drive the memory wheel in the opposite direction in equal increments, until the drill bit is again on bottom, at which time the screw 102b will engage the actuating leaf 104a and actuate the "off bottom" switch 104.

A mechanically actuated "off bottom" counter 118, shown at the left of Figure 4, is coupled to the shaft 96 of the ratchet wheel 92 through gears 120 and 122. The ratio of these gears is such that the "off bottom" counter will indicate the number of feet the drill bit is lifted off the bottom of the bore hole.

One terminal 84a of the "down" solenoid 84 is connected to the "common" circuit lead 76 while the other terminal 84b is connected through a lead 106 to the normally closed fixed contact 104b of the single-pole-double-throw "off bottom" switch 104. The movable contact 104d of the "off bottom" switch 104 is connected to the "down" circuit lead 80. The normally open fixed contact 104c of the "off bottom" switch 104 is connected through the lead 108 to the movable contact 110a of a single-pole-double-throw "hold in" switch 110. The normally closed fixed contact 110b of the "hold in" switch 110 is connected through a lead 112 with the input terminal of a "skip pulser" 115.

The "skip pulser" 115 is one of a number of devices known in the art which receives a series of pulses and transmits only alternate ones of these pulses. The output terminal of the skip pulser is connected through a lead with one terminal 114a of an electrically actuated "total depth" counter 114. The other terminal 114b of the total depth counter is connected to the common lead 76. The normally open fixed contact 110c of the hold in switch 110 is connected through the lead 116 with the terminal 84b of the "down" solenoid 84.

The operation of the mechanism is as follows:

During the normal drilling, as the drill bit at the bottom of the drill string cuts into the earth and deepens the bore hole, the drill string 12 and the traveling block 26 gradually descend, causing the strand of cable 28 which is engaged by the wheel 38 to move downwardly through a distance twice as great as that through which the drill string 12 moves. For each six inches of movement of the drill string, the wheel 38 is rotated through one revolution, closing the "down" switch 72 (Figure 3) once and sending a single pulse of current from the battery 75 into the "down" circuit lead 80. These pulses of current pass through the closed contacts 104d and 104c of the "off bottom" switch 104, through the lead 108, and through the closed contacts 110a and 110b of the hold in switch 110 to the skip pulser 115. Alternate ones of these pulses (that is, one pulse for each foot of depth) is passed by the skip pulser 115 to one of the terminals 114a of the total depth counter 114. The other terminal 114b is connected through the common lead 76 and the closed "dead line" switch 86 back to the other terminal of the battery 75. The pulses will thus actuate the total depth counter and cause it to record the increase in depth of the bore hole.

When the drilling tool is lifted off bottom, for example for the purpose of adding an additional joint of pipe to the drill string, the movement of the cable 28 in the upward direction will rotate the wheel 38 and cause the "up" switch 70 (Figure 3) to be closed once for each six inches of movement of the drill string. This sends a series of pulses of current from the battery 75 through the "up" circuit lead 78, and to the "up" solenoid 82. Each time the "up" solenoid 82 receives one of these pulses, it is energized to attract its armature 88 and index the ratchet wheel 82 in the counterclockwise direction. This drives the memory wheel 102 in a series of incremental movements in a clockwise direction. Upon the first of these incremental movements of the memory wheel in the "up" direction, the screw 102b disengages the actuating leaf 104a of the "off bottom" switch 104, actuating the switch to throw its movable contact 104d out of engagement with the normally open fixed contact 104c and into engagement with the normally closed fixed contact 104b. This disconnects the "down" circuit from the total depth counter 114 and connects it instead to the "down" solenoid 84.

When the drill string has been hoisted upwardly a sufficient distance to place the upper end of the uppermost joint of drill pipe above the level of the rotary table 18, "slips" are inserted into the slip bowl of the rotary table to engage and support the drill string. Thereupon the lower end of the kelly 16 is disconnected from the upper end of the drill string, so that the weight of the drill string is no longer supported by the traveling block 26. This removes most of the tension from the cable 28 and allows the "dead line" switch 86 to open. The opening of this switch 86 breaks the "common" lead 76 and renders the measuring apparatus inoperative. Thus, the apparatus is not affected by movements of the traveling block when it is lowered to put the kelly into the "rat hole" or to pick up an additional joint of drill pipe to be connected onto the upper end of the drill string.

When the additional section of drill pipe has been installed and the kelly has been again connected to the upper end of the drill string and the slips are removed, the "dead line" switch 86 is again closed. Then, as the drill string is again lowered to the bottom of the bore hole, the cable 28 drives the wheel 38 of the pick-up head in the reverse direction, closing the "down" switch 72 once for each foot of movement of the drill string. This sends a series of pulses through the "down" circuit lead 80, the closed contacts 104d and 104b of the "off bottom" switch 104, and the lead 106 to the "down" solenoid 84. Upon each such pulse, the "down" solenoid 84 is energized to attract its armature 90 and index the ratchet wheel 92 one step in the clockwise direction. This drives the memory wheel 102 through angular increments in the counterclockwise direction. Since the drill string is lowered the same number of feet it was raised, the "down" solenoid is actuated the same number of times that the "up" solenoid 82 was actuated, so that the memory wheel 102 is driven back to its original starting or "on bottom" position, at which the screw 102b engages the actuating leaf 104a of the "off bottom" switch 104 and again actuates the switch 104 to move its movable contact 104d out of engagement with the fixed contact 104b and into engagement with the fixed contact 104c. Thus, any future pulses that are received in the "down" circuit lead 80 as the drilling progresses will be sent through the skip pulser to the total depth counter 114 rather than to the "down" solenoid 84.

The hold in switch 110 prevents a false "down" count which could otherwise occur if the final pulse necessary to return the memory wheel 102 to its "on bottom" position has not ended before the "down" circuit is switched to the total depth counter. As may be seen in Figure 4, the actuating leaf 110d of the hold in switch 110 extends beneath one end of the armature 90 of the "down" solenoid 84 so that the actuating leaf is depressed whenever the solenoid 84 is deenergized and is released when the armature 84 is energized. Thus when the final "down" pulse energizes the "down" solenoid 84, the actuating leaf 110d of the "hold in" switch 110 is released to throw its movable contact 110a out of engagement with the fixed contact 110b into engagement with the fixed contact 110c, thereby preventing the "down" pulse from reaching the total depth counter 114 and routing it instead to the "down" solenoid 84. As long as this final pulse continues, the "down" solenoid will remain energized (even after the "off bottom" switch 104 has been actuated by the screw 102b of the memory wheel 102), and the pulse cannot reach the total depth counter 114. As soon as the final pulse ends, the "down" solenoid 84 is deenergized, allowing its armature to be retracted by the spring 85 and depress the "hold in" switch 110. This will throw its movable contact 110a into engagement with the normally open fixed contact 110b and again connect the "down" circuit through the skip pulser to the total depth counter 114. Thus, alternate "down" pulses which are received as the drilling progresses will cause indications on the total depth counter 114.

Figure 5:
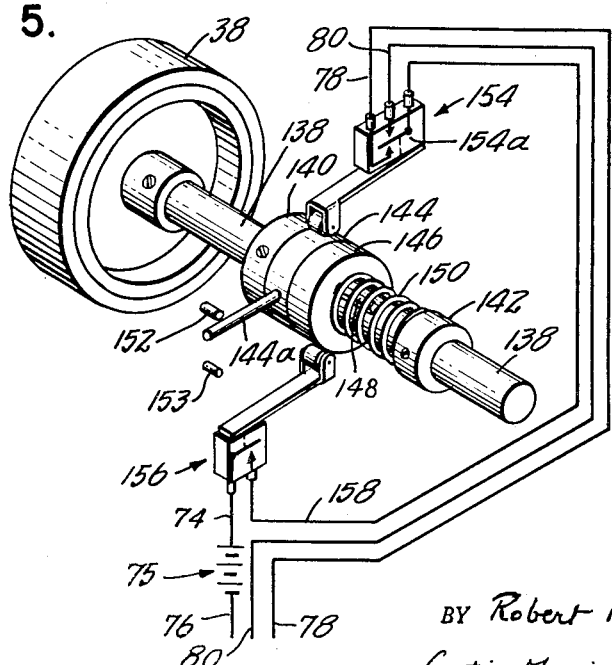
Figure 5 is a skeleton view of an alternative form of pick-up head which may be used in the apparatus.

Figure 5 shows an alternative construction of pickup head which may be employed in lieu of the one shown in detail in Figure 3. As may be seen in Figure 5, the wheel 38 which frictionally engages the cable 28 is fixed on a shaft 138 on which is also fixed a clutch plate 140 and a spring collar 142. Rotatably mounted on shaft 138 in face-to-face relation with the clutch plate 140 is a first switch-actuating cam 144, at the other face of which is a second switch-actuating cam 146 which is supported on the shaft 138 and keyed against rotation by a key 148 which permits the cam 146 to slide longitudinally of the shaft 138. A coil spring 150 which is compressed between the collar 142 and the outer face of the latter cam 146 urges the cam 146 toward the cam 144 so that the cam 144 is frictionally gripped between the cam 146 and the clutch plate 140. Rotation of the cam 144 is limited by an arm 144a which extends radially from the periphery of the cam and is received between a pair of stop pins 152 and 153 which are spaced apart to allow the cam 144 to move through an angle of only about 30°. Riding on the periphery of the cam 144 is the roller leaf actuator 154a of a single-pole-double-throw "reversing" switch 154, and similarly engaging the periphery of the cam 146 is the roller leaf actuator 156a of a single-pole-single-throw "pulsing" switch 156.

This mechanism operates as follows: When the drill string is lowered, the cable 28 drives the wheel 38 in a counterclockwise direction, as viewed in Figure 3 and as indicated by the arrow marked "down." This also rotates the shaft 138 (see Figure 5), clutch plate 140 and cam 146 in a counterclockwise direction. Each revolution of the cam 146, an elevated portion of the cam depresses the actuating leaf 156a of the pulsing switch 156, closing the switch and sending a pulse of current from the battery 75 into the line 158 which is connected to the movable contact 154a of the reversing switch 154. Depending upon the condition of the reversing switch 154, this pulse of current is fed into the "up" circuit lead 78 or the "down" circuit lead 80.

The rotation of the clutch plate 140 and the cam 146 in the counterclockwise direction, as just described, frictionally urges the cam 144 to rotate in the same direction, which it will do until the arm 144a engages the lower stop pin 153. The arm 144a will continue to ride against the stop pin 153 until the direction of the drill string is reversed. When this occurs, the cam 144 will be frictionally urged to rotate in the clockwise direction until the arm 144a engages the upper stop pin 152. The cam 144 is so shaped and oriented that movement between the two positions at which the arm 144a is in engagement with the respective stop pins 152 and 153 is sufficient to throw the reversing switch 154 from one position to the other. Thus when the drill string is moving downwardly, the reversing switch 154 is in such position as to send the pulses received from the pulsing switch 156 into the "down" circuit and when the drill string is moving upwardly, these pulses are sent into the "up" circuit.

From the foregoing description, it will be understood that the present invention provides a practical apparatus for measuring the distance which the drill string moves into the bore hole—in other words, the depth of the bore hole—the measurement being made automatically and with compensation for any movements of the drill string off the bottom of the bore hole and without recording any movements of the traveling block during the time the drill string is not also being moved. It will therefore be appreciated that the aforementioned and other desirable objectives have been achieved. However, it should be emphasized that the particular embodiments of the invention which are shown and described herein are intended as merely illustrative of the invention rather than as restrictive thereof, and that various modifications may be made in these embodiments in order to adapt them for conditions of varying use without departing from the scope of the invention as defined by the appended claims.

What I claim is:

1. Apparatus for measuring the depth of a well bore hole comprising a pickup mechanism mechanically associated with the drill string supporting tackle, said mechanism including a measuring switch means adapted to be actuated to form an electrical pulse each time the drill string is moved vertically through a given increment of distance, and a directional switch means arranged to connect said pulses into either an "up" circuit or a "down" circuit depending on the direction of movement of said drill string, an electrically responsive memory means connected to both said circuits and adapted to be varied from an "on bottom" condition to an "off bottom" condition depending upon the number of pulses received in said "up" circuit and returned to said "on bottom" condition only when an equal number of pulses have been received in said "down" circuit, an "off bottom" switch means adapted to be actuated in accordance with the condition of said memory means, and an electrically responsive depth counter connected to said "down" circuit through said "off bottom" switch means, and adapted to give a depth indication proportional to the number of pulses received in said "down" circuit when said memory means is in said "on bottom" condition.

2. Apparatus for measuring the depth of a well bore hole comprising a pickup mechanism mechanically associated with the drill string supporting tackle, said mechanism including a measuring switch means adapted to be actuated to form an electrical pulse each time the drill string is moved vertically through a given increment of distance, and a directional switch means arranged to connect said pulses into either an "up" circuit or a "down" circuit depending on the direction of movement of said drill string, a movable memory element, electrically responsive drive means for moving said memory element, said drive means being connected into both said circuits and being adapted to move said memory element from an "on bottom" position in one direction in incremental steps according to the number of pulses received in said "up" circuit and to move said memory element in the opposite direction in equal incremental steps according to the number of pulses received in said "down" circuit, an "off bottom" switch arranged to be actuated by said memory element when it moves to or from said "on bottom" position, and an electrically responsive depth counter connected to said "down" circuit through said "off bottom" switch and adapted to give a depth indication proportional to the number of pulses received in said "down" circuit when said memory element is in said "on bottom" position.

3. Apparatus for measuring the depth of a well bore hole comprising a pickup mechanism mechanically associated with the drill string supporting tackle, said mechanism including a measuring switch means adapted to be actuated to form an electrical pulse each time the drill string is moved vertically through a given increment of distance, and a directional switch means arranged to connect said pulses into either an "up" circuit or a "down" circuit depending on the direction of movement of said drill string, a "dead line" switch mechanically associated with said drill string supporting tackle and electrically connected in both said circuits to open the same when said drill string is not supported by said tackle, an electrically responsive memory means connected to both said circuits and adapted to be varied from an "on bottom" condition to an "off bottom" condition depending upon the number of pulses received in said "up" circuit and returned to said "on bottom" condition only when an equal number of pulses have been received in said "down" circuit, an "off bottom" switch means adapted to be actuated in accordance with the condition of said memory means, and an electrically responsive depth counter connected to said "down" circuit through said "off bottom" switch means adapted to give a depth indication proportional to the number of pulses received in said "down" circuit when said memory means is in said "on bottom" condition.

4. Apparatus for measuring the depth of a well bore hole comprising a pickup mechanism mechanically associated with the drill string supporting tackle, said mechanism including a measuring switch means adapted to be actuated to form an electrical pulse each time the drill string is moved vertically through a given increment of distance, and a directional switch means arranged to connect said pulses into either an "up" circuit or a "down" circuit depending on the direction of movement of said drill string, a movable memory element, a pair of solenoids mechanically coupled to said memory element including an "up" solenoid connected in said "up" circuit and arranged to be actuated by each of the pulses received therein and arranged upon each such actuation to index said memory element an incremental step in one direction from an "on bottom" position, and a "down" solenoid arranged upon each actuation to index said memory element an incremental step in the opposite direction, an "off bottom" switch arranged to be actuated by said memory element when it moves to or from said "on bottom" position, said "down" solenoid being connected into said "down" circuit through said "off bottom" switch whereby it is actuated by the pulses received in said circuit when said memory element is in a position other than said "on bottom" position, and an electrically responsive depth counter connected to said "down" circuit through said "off bottom" switch and adapted to give a depth indication proportional to the number of pulses received in said "down" circuit when said memory element is in said "on bottom" position.

5. Apparatus for measuring the depth of a well bore hole comprising a pickup mechanism mechanically associated with the drill string supporting tackle, said mechanism including a measuring switch means adapted to be actuated to form an electrical pulse each time the drill string is moved vertically through a given increment of distance, and a directional switch means arranged to connect said pulses into either an "up" circuit or a "down" circuit depending on the direction of movement of said drill string, a movable memory element, a pair of solenoids mechanically coupled to said memory element including an "up" solenoid connected in said "up" circuit and arranged to be actuated by each of the pulses received therein and arranged upon each such actuation to index said memory element an incremental step in one direction from an "on bottom" position, and a "down" solenoid arranged upon each actuation to index said memory element an incremental step in the opposite direction, an "off bottom" switch arranged to be actuated by said memory element when it moves to or from said "on bottom" position, a hold in switch actuated by said "down" solenoid, said "down" solenoid being connected into said "down" circuit through said "off bottom" switch said hold in switch in parallel, whereby it is actuated by the pulses received in said circuit when said memory element is in a position other than said "on bottom" position and is maintained in actuated condition by said hold-in switch after said memory element returns to said "on bottom" position and during continuation of the last "down" pulse necessary to return said memory element to said "on bottom" position, and an electrically responsive depth counter connected to said "down" circuit through said "off bottom" switch and said hold in switch in series, whereby said depth counter will give a depth indication proportional to the number of "down" pulses received during the time said memory element is in said "on bottom" position exclusive of the last pulse necessary to return said memory element to said "on bottom" position after movement therefrom.

6. In an apparatus for measuring the depth of a well bore hole being drilled by a rotary drilling rig in which the drill string is supported by cable tackle, means for sensing the distance and direction of movement of said drill string into or out of said bore hole comprising a wheel having its periphery yieldably urged into frictional engagement with a portion of said cable which moves proportionally to the movement of said drill string, a cam mechanically coupled to said wheel for rotation thereby, a movable switch actuating member positioned to be actuated by said cam in one direction or the other depending upon the direction of movement of said drill string, and a pair of electrical switches, one mounted at each side of said movable switch actuating member and in position to be actuated by said switch actuating member whereby movement of said drill string in one direction will actuate one of said switches once for each unit of movement of said drill string and movement of said drill string in the other direction will cause similar actuation of the other of said switches.

7. In an apparatus for measuring the depth of a well bore hole being drilled by a rotary drilling rig in which the drill string is supported by cable tackle, means for sensing the distance and direction of movement of said drill string into or out of said bore hole comprising a wheel having its periphery yieldably urged into frictional engagement with a portion of said cable which moves proportionally to the movement of said drill string, a shaft mechanically coupled to said wheel for rotation thereby, a first cam rotatably mounted on said shaft, a clutch member fixed on said shaft for frictional driving engagement with said first cam, stop means engageable with said first cam to limit the movement of said first cam to a small fraction of a revolution, a reversing switch means engaged by said first cam and adapted to be actuated during movement of said first cam between its two extremes of movement, a second cam mounted on said shaft, and a pulsing switch engaged by said second cam and adapted to be actuated an integral number of times during each revolution of said shaft.

8. Apparatus for measuring the depth of a well bore hole comprising a pickup mechanism mechanically associated with the drill string supporting tackle, said mechanism including a measuring switch means adapted to be actuated to form an electrical pulse each time the drill string is moved vertically through a given increment of distance, and a directional switch means arranged to connect said pulses into either an "up" circuit or a "down" circuit depending on the direction of movement of said drill string, an electrically responsive memory means connected to both said circuits and adapted to be varied from an "on bottom" condition to an "off bottom" condition depending upon the number of pulses reecived in said "up" circuit and returned to said "on bottom" condition only when an equal number of pulses have been received in said "down" circuit, an "off bottom" switch means adapted to be actuated in accordance with the condition of said memory means, a "skip pulser" having its input connected to said "off bottom" switch means to receive each of the pulses therein and to present at its output only alternate ones of these pulses, and an electrically responsive depth counter connected to the output of said skip pulser, and adapted to give a depth indication upon each alternate one of the pulses reecived in said "down" circuit when said memory means is in said "on bottom" position.

References Cited in the file of this patent

UNITED STATES PATENTS

| | | |
|---|---|---|
| 2,326,219 | Hayward | Aug. 10, 1943 |
| 2,756,506 | Scivally | July 31, 1956 |

FOREIGN PATENTS

| | | |
|---|---|---|
| 572,795 | Germany | Mar. 25, 1933 |